United States Patent
Mosayyebpour Kaskari

(10) Patent No.: US 12,456,482 B2
(45) Date of Patent: Oct. 28, 2025

(54) NEURAL TEMPORAL BEAMFORMER FOR NOISE REDUCTION IN SINGLE-CHANNEL AUDIO SIGNALS

(71) Applicant: Synaptics Incorporated, San Jose, CA (US)

(72) Inventor: Saeed Mosayyebpour Kaskari, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 204 days.

(21) Appl. No.: 18/160,278

(22) Filed: Jan. 26, 2023

(65) Prior Publication Data

US 2024/0257827 A1  Aug. 1, 2024

(51) Int. Cl.
G10L 25/78 (2013.01)
G10L 21/0208 (2013.01)
G10L 25/93 (2013.01)

(52) U.S. Cl.
CPC .......... *G10L 25/78* (2013.01); *G10L 21/0208* (2013.01); *G10L 25/93* (2013.01); G10L 2025/932 (2013.01)

(58) Field of Classification Search
CPC ..... G10L 25/78; G10L 21/0208; G10L 25/93; G10L 2025/932; G10L 25/30; G10L 2021/0216
See application file for complete search history.

(56) References Cited

U.S. PATENT DOCUMENTS 5,638,487 A  6/1997 Chigier
7,343,283 B2  3/2008 Ashley et al.
(Continued)

FOREIGN PATENT DOCUMENTS

| CN | 111883171 A | 11/2020 |
|---|---|---|
| DE | 102019112383 A1 | 12/2019 |
| KR | 20240030483 A | 3/2024 |

OTHER PUBLICATIONS

Tammen et al., ("DNN-Based Speech Presence Probability Estimation for Multi-Frame Single-Microphone Speech Enhancement," ICASSP 2020—2020 IEEE International Conference on Acoustics, Speech and Signal Processing (ICASSP), Barcelona, Spain, 2020) (Year: 2020).*

Tammen et al., ("Deep multi-frame MVDR filtering for single-microphone speech enhancement." ICASSP 2021-2021 IEEE International Conference on Acoustics, Speech and Signal Processing (ICASSP). IEEE, 2021) (Year: 2021).*

(Continued)

*Primary Examiner* — Bhavesh M Mehta
*Assistant Examiner* — Jangwoen Lee
(74) *Attorney, Agent, or Firm* — Paradice & Li LLP

(57) ABSTRACT

This disclosure provides methods, devices, and systems for audio signal processing. The present implementations more specifically relate to multi-frame beamforming using neural network supervision. In some aspects, a speech enhancement system may include a linear filter, a deep neural network (DNN), a voice activity detector (VAD), and an IFC calculator. The DNN infers a probability of speech ($p_{DNN}$) in a current frame of a single-channel audio signal based on a neural network model. The VAD determines whether speech is present or absent in the current audio frame based on the probability of speech $p_{DNN}$. The IFC calculator may estimate an IFC vector based on the output of the DNN (such as the probability of speech $p_{DNN}$) and the output of the VAD (such as an indication of whether speech is present in the current frame). The linear filter uses the IFC vector to suppress noise in the current audio frame.

20 Claims, 8 Drawing Sheets

(56) References Cited

U.S. PATENT DOCUMENTS

| | | | |
|---|---|---|---|
| 2018/0182411 A1 | 6/2018 | Kaskari et al. | |
| 2018/0308503 A1 | 10/2018 | Kaskari et al. | |
| 2019/0130161 A1 | 5/2019 | Chang et al. | |
| 2019/0172476 A1* | 6/2019 | Wung | G10L 21/0232 |
| 2019/0385630 A1 | 12/2019 | Sivaraman et al. | |
| 2021/0125622 A1 | 4/2021 | Zhao | |
| 2022/0013123 A1 | 1/2022 | Xu et al. | |
| 2022/0122597 A1 | 4/2022 | Ji et al. | |
| 2023/0074658 A1 | 3/2023 | Sereshki et al. | |
| 2023/0090763 A1 | 3/2023 | Ozturk et al. | |

OTHER PUBLICATIONS

Zhou et al. ("A robust dual-microphone generalized sidelobe canceller using a bone-conduction sensor for speech enhancement." Sensors 21.5 (2021)) (Year: 2021).*

U.S. Appl. No. 18/310,818, filed May 2, 2023, entitled "Neural Noise Reduction With Linear and Nonlinear Filtering for Single-Channel Audio Signals," 35 pgs.

Athineos et al., "Frequency-Domain Linear Prediction for Temporal Features," in Proc. IEEE ASRU Workshop, pp. 261-266, Dec. 2003.

Graf et al., "Features for Voice Activity Detection: A Comparative Analysis," EURASIP Journal on Advances in Signal Processing, pp. 1-15, (2015) 2015:91.

Nesta et al., "On-line Multi-Channel Estimation of Source Spectral Dominance," in International Conference on Latent Variable Analysis and Signal Separation. Springer, pp. 404-412, 2015.

Shen et al. "Voice Activity Detection Based on Sequential Gaussian Mixture Model with Maximum Likelihood Criterion" IEEE, International Symposium on Chinese Spoken Language Processing (ISCSLP), pp. 1-5, Oct. 2016.

Tashev et al., "Unified Framework for Single Channel Speech Enhancement," IEEE Pacific Rim Conference on Communications, Computers and Signal Processing, 6 pages, Aug. 2009.

U.S. Appl. No. 18/155,674, filed Jan. 17, 2023, entitled "Multi-Pass Neural Network for Speech Enhancement" pp. 1-38.

Wang et al, "Sequential Multi-frame Neural Beamforming for Speech Separation and Enhancement," 2021 IEEE Spoken Language Technology Workshop (SLT), 2021, pp. 905-911, 2021.

Zhang et al., "Multi-Channel Multi-Frame ADL-MVDR for Target Speech Separation," 12 pages, arXiv:2012.13442v1 [eess.AS] Dec. 24, 2020.

International Search Report and Written Opinion from PCT Application No. PCT/US2024/027104, dated Aug. 20, 2024, pp. 1-10.

Q. tao, D. hao, Y. yong, Z. yifei, Y. changmao and L. yuxuan, "Speech recognition based on denoising self coding neural network," 2020 International Conference on Big Data, Artificial Intelligence and Internet of Things Engineering (ICBAIE), Fuzhou, China, 2020, pp. 327-333, doi: 10.1109/ICBAIE49996. (Year: 2020).

* cited by examiner

NEURAL TEMPORAL BEAMFORMER FOR NOISE REDUCTION IN SINGLE-CHANNEL AUDIO SIGNALS

TECHNICAL FIELD

The present implementations relate generally to signal processing, and specifically to a neural temporal beamformer for noise reduction in single-channel audio signals.

BACKGROUND OF RELATED ART

Many hands-free communication devices include microphones configured to convert sound waves into audio signals that can be transmitted, over a communications channel, to a receiving device. The audio signals often include a speech component (such as from a user of the communication device) and a noise component (such as from a reverberant enclosure). Speech enhancement is a signal processing technique that attempts to suppress the noise component of the received audio signals without distorting the speech component. Many existing speech enhancement techniques rely on statistical signal processing algorithms that continuously track the pattern of noise in each frame of the audio signal to model a spectral suppression gain or filter that can be applied to the received audio signal in a time-frequency domain.

Beamforming is a signal processing technique that can focus the energy of audio signals in a particular spatial direction (also referred to as a "beam"). For example, a beamformer can improve the quality of speech in audio signals received via a microphone array through signal combining at the microphone outputs. More specifically, the beamformer may apply a respective weight to the audio signal output by each microphone of the microphone array so that signal strength is enhanced in the direction of speech (or suppressed in the direction of noise) when the audio signals combine. Adaptive beamformers are capable of dynamically adjusting the weights of the microphone outputs to optimize the quality, or the signal-to-noise ratio (SNR), of the combined audio signal. Example adaptive beamforming techniques include minimum mean square error (MMSE), minimum variance distortionless response (MVDR), generalized eigenvalue (GEV), and generalized sidelobe cancelation (GSC), among other examples.

Traditional beamforming exploits the spatial diversity of audio signals captured by multiple microphones (in a microphone array) to steer the beam in the direction of speech. However, many hands-free communication devices (such as battery-powered headsets or earbuds) lack microphone arrays, which are necessary for spatial diversity. More specifically, many hands-free communication devices have only a single microphone input and can therefore capture only a single channel of audio signals. Thus, traditional beamforming techniques may not be suitable for speech enhancement in many existing hands-free communication devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of speech enhancement. The method includes steps of receiving a series of frames of a single-channel audio signal; inferring a probability of speech ($p_{DNN}$) in a first frame of the series of frames based on a neural network; determining a voice activity detection (VAD) parameter based at least in part on the probability of speech $p_{DNN}$, where the VAD parameter indicates whether speech is present or absent in the first frame; determining an IFC vector associated with a speech component of the audio signal based at least in part on the probability of speech $p_{DNN}$ and the VAD parameter, where the IFC vector indicates an interframe correlation of the speech component between consecutive frames in the series of frames; and filtering a noise component of the audio signal from the first frame based at least in part on the IFC vector and the series of frames.

Another innovative aspect of the subject matter of this disclosure can be implemented in a speech enhancement system, including a processing system and a memory. The memory stores instructions that, when executed by the processing system, cause the speech enhancement system to receive a series of frames of a single-channel audio signal; infer a probability of speech ($p_{DNN}$) in a first frame of the series of frames based on a neural network; determine a voice activity detection (VAD) parameter based at least in part on the probability of speech $p_{DNN}$, where the VAD parameter indicates whether speech is present or absent in the first frame; determine an IFC vector associated with a speech component of the audio signal based at least in part on the probability of speech $p_{DNN}$ and the VAD parameter, where the IFC vector indicates an interframe correlation of the speech component between consecutive frames in the series of frames; and filter a noise component of the audio signal from the first frame based at least in part on the IFC vector and the series of frames.

BRIEF DESCRIPTION OF THE DRAWINGS

The present implementations are illustrated by way of example and are not intended to be limited by the figures of the accompanying drawings.

DETAILED DESCRIPTION

Figure 1:
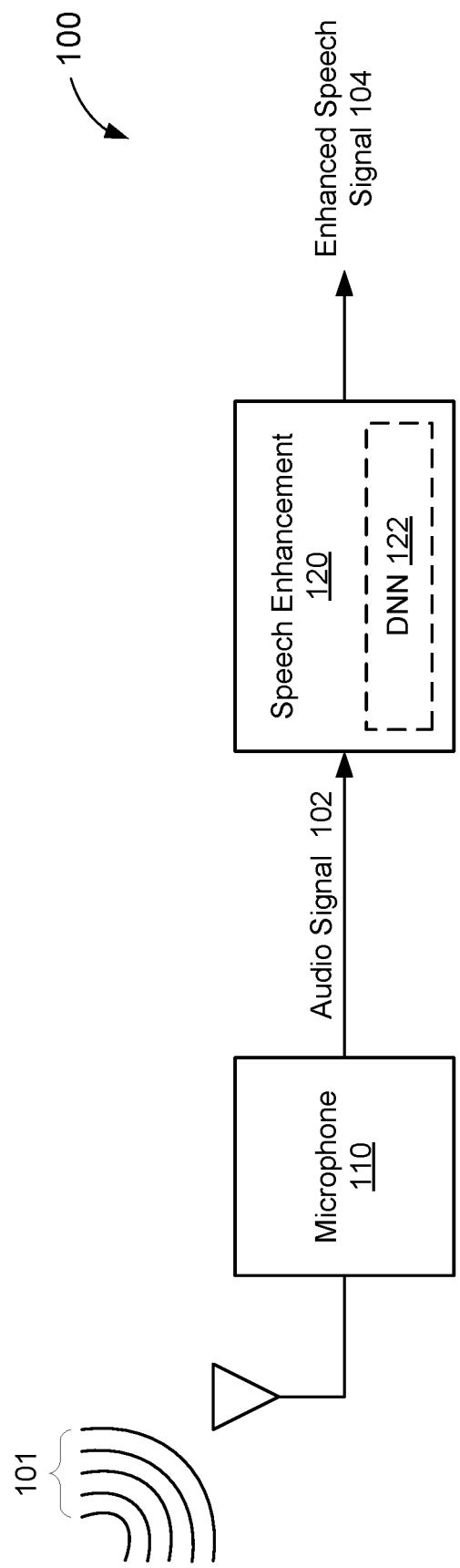
FIG. 1 shows an example audio receiver that supports single channel speech enhancement.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, beamforming is a signal processing technique that can focus the energy of received audio signals in a particular spatial direction (also referred to as a "beam"). Traditional beamforming exploits the spatial diversity of audio signals captured by multiple microphones (in a microphone array) to steer the beam in the direction of speech. However, many hands-free communication devices (such as battery-powered headsets or earbuds) lack microphone arrays, which are necessary for spatial diversity. Aspects of the present disclosure recognize that the speech component of an audio signal may appear stationary while exhibiting strong temporal correlation across consecutive frames the audio signal that are captured or acquired within a very short duration of time. Accordingly, multiple frames of a single-channel audio signal can be treated as separate (concurrent) inputs to a beamformer.

As used herein, the term "multi-frame beamforming" refers to any beamforming technique that can be used to enhance speech in single-channel audio signals using consecutive frames of an audio signal. Unlike traditional beamforming techniques, which rely on the spatial properties of multi-channel audio signals, multi-frame beamforming exploits the temporal characteristics of single-channel audio signals to enhance speech. More specifically, multi-frame beamforming depends on accurately predicting or estimating the correlation of speech between consecutive audio frames (also referred to as the "interframe correlation of speech"). The interframe correlation (IFC) of speech is often modeled as a vector that can be used to align consecutive frames of an audio signal so that the speech component of the audio signal combines in a constructive manner when the audio frames are summed.

The IFC vector changes quickly over time and can be difficult to predict using conventional statistic signal processing techniques. Aspects of the present disclosure recognize that machine learning can be used to more accurately track the correlation of speech (and noise) between consecutive audio frames over time. Machine learning, which generally includes a training phase and an inferencing phase, is a technique for improving the ability of a computer system or application to perform a certain task. During the training phase, a machine learning system is provided with one or more "answers" and a large volume of raw training data associated with the answers. The machine learning system analyzes the training data to learn a set of rules that can be used to describe each of the one or more answers. During the inferencing phase, the machine learning system may infer answers from new data using the learned set of rules.

Deep learning is a particular form of machine learning in which the inferencing (and training) phases are performed over multiple layers, producing a more abstract dataset in each successive layer. Deep learning architectures are often referred to as "artificial neural networks" due to the manner in which information is processed (similar to a biological nervous system). For example, each layer of an artificial neural network may be composed of one or more "neurons." The neurons may be interconnected across the various layers so that the input data can be processed and passed from one layer to another. More specifically, each layer of neurons may perform a different transformation on the output data from a preceding layer so that the final output of the neural network results in a desired inference. The set of transformations associated with the various layers of the network is referred to as a "neural network model."

Various aspects relate generally to audio signal processing, and more particularly, to multi-frame beamforming using neural network supervision to track the IFC of speech between consecutive frames of a single-channel audio signal. In some aspects, a speech enhancement system may include a linear filter, a deep neural network (DNN), a voice activity detector (VAD), and an IFC calculator. The DNN is configured to infer a probability of speech ($p_{DNN}$) in a current frame of a single-channel audio signal based on a neural network model. The VAD is configured to determine whether speech is present or absent in the current audio frame based, at least in part, on the probability of speech $p_{DNN}$. In some implementations, the IFC calculator may estimate an IFC vector based on the output of the DNN (such as the probability of speech $p_{DNN}$) and the output of the VAD (such as an indication of whether speech is present or absent in the current audio frame). The linear filter uses the IFC vector to reduce or suppress noise in the current audio frame.

In some aspects, the linear filter may produce an enhanced audio frame (Y) based on multiple frames of the single-channel audio signal (X), where X is a vector that includes the current audio frame ($X_0$), a number of future audio frames ($X^{future}$) that are captured after the current audio frame $X_0$, and a number of past audio frames ($X^{past}$) that are captured before the current audio frame $X_0$. In some implementations, the linear filter may include a multi-frame minimum variance distortionless response (MF-MVDR) beamformer. In such implementations, the IFC vector ($\alpha_{MVDR}$) may be used to calculate the filter coefficients of an MVDR filter ($w_{MVDR}$), where $Y=w_{MVDR}^H X$. In some other implementations, the linear filter may include a multi-frame generalized sidelobe cancellation (MF-GSC) beamformer. In such implementations, the IFC vector ($\alpha_{GSC}$) may be used to estimate a noise signal ($E_{GSC}$) representing the noise component of the current audio frame, where $E_{GSC}=X_{MF}-\alpha_{GSC}^H X_0$ and $X_{MF}$ is a vector that includes only the future audio frames $X^{future}$ and the past audio frames $X^{past}$. The noise signal $E_{GSC}$ can be subtracted from the current audio frame $X_0$ to obtain the enhanced audio frame Y, where $Y=X_0-b_{GSC}^H E_{GSC}^T$ and $b_{GSC}$ is a filter that transforms the noise signal $E_{GSC}$ to be aligned with the current audio frame $X_0$.

Particular implementations of the subject matter described in this disclosure can be implemented to realize one or more of the following potential advantages. By using a neural network to track the IFC of speech between consecutive frames of a single-channel audio signal, aspects of the present disclosure can leverage beamforming techniques to improve the speech quality of single-channel audio signals. For example, MVDR is a well-known beamforming technique that utilizes a steering vector to focus the signal strength of spatially diverse audio signals in the direction of speech. In the MF-MVDR filter of the present implementations, the steering vector is substituted for the IFC vector so that the MVDR filter $w_{MVDR}$ can be applied to consecutive frames of a single-channel audio signal. Aspects of the present disclosure recognize that computing the MVDR filter may consume substantial processing resources (including power and memory). By contrast, the MF-GSC filter can be computed using a normalized least mean squares (NLMS) algorithm, which has more relaxed processing requirements.

FIG. 1 shows an example audio receiver 100 that supports single channel speech enhancement. The audio receiver 100 includes a microphone 110 and a speech enhancement component 120. The microphone 110 is configured to convert sound waves 101 (also referred to as "acoustic waves") into an audio signal 102. Thus, the audio signal 102 is an electrical signal representative of the acoustic waveform. In some aspects, the microphone may be associated with a single audio channel. Thus, the audio signal 102 also may be referred to as a "single-channel" audio signal.

In some implementations, the sound waves 101 may include user speech mixed with background noise or interference (such as reverberant noise from a headset enclosure). Thus, the audio signal 102 may include a speech component and a noise component. For example, the audio signal 102 (X(l,k)) can be expressed as a combination of the speech component (S(l,k)) and the noise component (N(l,k)), where l is a frame index and k is a frequency index associated with a time-frequency domain:

$$X(l, k) = S(l, k) + N(l, k)$$

The speech enhancement component 120 is configured to improve the quality of speech in the audio signal 102, for example, by suppressing the noise component N(l,k) or otherwise increasing the signal-to-noise ratio (SNR) of the audio signal 102. In some aspects, the speech enhancement component 120 may perform a linear filtering operation that attenuates the power of the noise component N(l,k) of the audio signal 102 to produce an enhanced speech signal 104. Thus, the enhanced speech signal 104 may have a higher SNR than the audio signal 102.

In some implementations, the linear filtering operation may be performed using a multi-frame beamformer. As describe above, multi-frame beamformers exploit the temporal characteristics of single-channel audio signals to enhance speech. More specifically, multi-frame beamforming relies on accurate predictions or estimations of the correlation of speech between consecutive audio frames (also referred to as the "interframe correlation of speech"). For example, the speech component S(l,k) can be decomposed into a correlated part (a(l,k)s(l,k)) and an uncorrelated part (s'(l,k)):

$$S(l, k) = a(l, k)s(l, k) + s'(l, k) \quad (1)$$
$$a(l, k) = \frac{\Phi_{SS}(l, k)e}{E[|s(l, k)|^2]} = \frac{\Phi_{SS}(l, k)e}{e^T \Phi_{SS}(l, k)e}$$

where a(l,k) is the interframe correlation (IFC) vector, $\Phi_{SS}(l,k)$ is a matrix representing the covariance of the speech component, and e is a vector selecting the first column of $\Phi_{SS}(l,k)$. Accordingly, the multi-frame signal model can be expressed as:

$$X(l, k) = a(l, k)s(l, k) + s'(l, k) + N(l, k)$$

where the uncorrelated speech component s'(l,k) is treated as interference.

A multi-frame beamformer may use the IFC vector a(l,k) to align consecutive frames of an audio signal, for example, so that the speech component S(l,k) combines in a constructive manner (or the noise component N(l,k) combines in a destructive manner) when multiple frames of the audio signal 102 are summed together. In some implementations, the IFC vector a(l,k) may be estimated or tracked over time based, at least in part, on a deep neural network (DNN) 122. For example, the DNN 122 may be trained to infer a likelihood or probability of speech in the current frame X(l,k) of the audio signal 102. Example suitable DNNs may include convolutional neural networks (CNNs) and recurrent neural networks (RNNs), among other examples.

During the training phase, the DNN 122 may be provided with a large volume of audio signals containing speech mixed with background noise. The DNN 122 also may be provided with clean speech signals representing only the speech component of each audio signal (without background noise). The DNN 122 compares the audio signals with the clean speech signals to determine a set of features that can be used to classify speech. During the inferencing phase, the DNN 122 infers a probability of speech in each frame of the audio signal 102, at each frequency index associated with the time-frequency domain, based on the classification results.

In some implementations, the speech enhancement component 120 may further determine whether the speech component S(l,k) is present (or absent) in each frame of the audio signal 102 based, at least in part, on the probability of speech inferred by the DNN 122. For example, the speech enhancement component 120 may convert the speech probability value (which may be a value between 0 and 1) to a binary value indicating that speech is either present or absent in a given frame (also referred to as a voice activity detection (VAD) parameter).

In some implementations, the speech enhancement component 120 may track the IFC of speech based, at least in part, on the VAD parameter. More specifically, the speech enhancement component 120 may update the IFC vector a(l,k) based, at least in part, on the probability of speech in the current audio frame when the VAD parameter indicates that speech is present in the current audio frame. On the other hand, the speech enhancement component 120 may refrain from updating the IFC vector a(l,k) when the VAD parameter indicates that speech is absent from the current audio frame.

Figure 2:
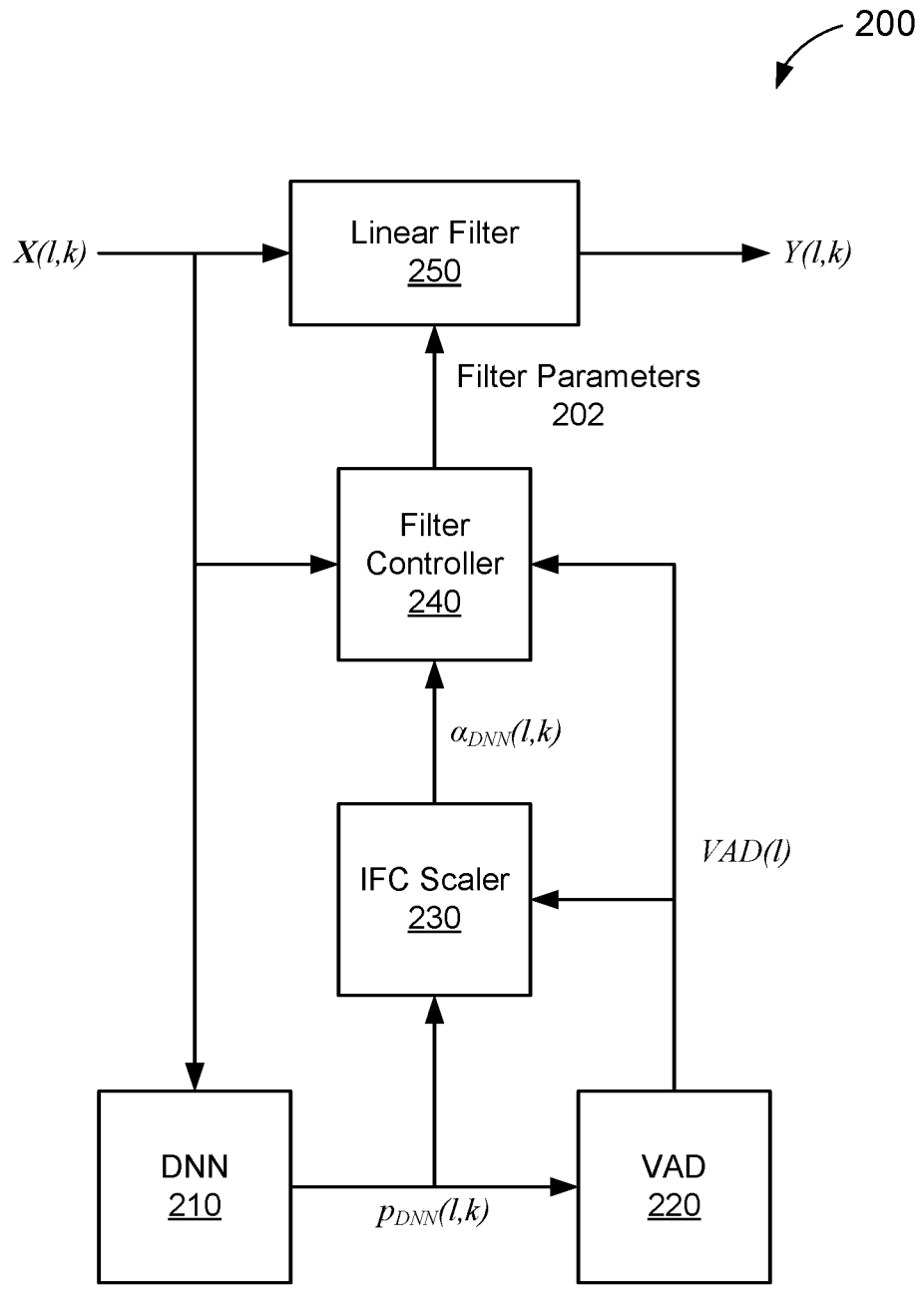
FIG. 2 shows a block diagram of an example speech enhancement system, according to some implementations.

FIG. 2 shows a block diagram of an example speech enhancement system 200, according to some implementations. In some aspects, the speech enhancement system 200 may be one example of the speech enhancement component 120 of FIG. 1. More specifically, the speech enhancement system 200 may receive a series of frames (X(l,k)) of an input audio signal and produce a corresponding frame (Y(l,k)) of an enhanced audio signal by filtering or suppressing noise in the audio signal. With reference for example to FIG. 1, the input audio signal may be one example of the single-channel audio signal 102 and the enhanced audio signal may be one example of the enhanced speech signal 104.

The series of input audio frames X(l,k) includes the current audio frame to be processed ($X_0$(l,k)), a number (c) of future audio frames ($X^{future}$(l,k)) that follow the current audio frame $X_0$(l,k) in time, and a number (d) of past audio frames ($X^{past}$(l,k)) that precede the current audio frame $X_0$(l,k) in time, such that:

$$X(l, k) = [X_0(l, k), X^{future}(l, k), X^{past}(l, k)]$$
$$X^{future}(l, k) = [X_{+\Delta}(l, k), X_{+2\Delta}(l, k), \ldots, X_{+c\Delta}(l, k)]$$
$$X^{past}(l, k) = [X_{-\Delta}(l, k), X_{-2\Delta}(l, k), \ldots, X_{-d\Delta}(l, k)]$$

where c+d≥1 and Δ is a delay parameter that determines a delay between successive frames in the series of input audio frames X(l,k). In some implementations, the delay parameter Δ may be set to a value less than a frame hop associated with the speech enhancement system 200 (such as 1 sample) to ensure temporal speech correlation across the input audio frames X(l,k).

For example, given a fast Fourier transform (FFT) size of K (where K is the number of frequency bins associated with the FFT), the current audio frame $X_0$(l,k) can be expressed as:

FFT(x[n],x[n+1], . . . ,x[n+K−1])=[X(l,0),X (l,1), . . . ,X(l,K−1)]≡$X_0$(l,k)

and the past audio frames $X^{past}$(l,k) can be expressed as:

$$FFT(x[n - \Delta], x[n - \Delta + 1], \ldots, x[n - \Delta + K - 1]) \equiv X_{-\Delta}(l, k)$$
$$FFT(x[n - d\Delta], x[n - d\Delta + 1], \ldots, x[n - d\Delta + K - 1]) \equiv X_{-d\Delta}(l, k)$$

and the future audio frames $X^{future}$(l,k) can be expressed as:

$$FFT(x[n + \Delta], x[n + \Delta + 1], \ldots, x[n + \Delta + K - 1]) \equiv X_{+\Delta}(l, k)$$
$$FFT(x[n + c\Delta], x[n + c\Delta + 1], \ldots, x[n + c\Delta + K - 1]) \equiv X_{+c\Delta}(l, k)$$

In some implementations, the speech enhancement system 220 may include a DNN 210, a voice activity detector (VAD) 220, an IFC scaler 230, a filter controller 240, and a linear filter 250. The DNN 210 is configured to infer a probability of speech $p_{DNN}$(l,k) in the current audio frame $X_0$(l,k) based on a neural network model, where 0≤$p_{DNN}$(l,k)≤1. In some implementations, the DNN 210 may be one example of the DNN 122 of FIG. 1. The VAD 220 is configured to determine or predict whether speech is present (or absent) in the current audio frame $X_0(l,k)$ based, at least in part, on the probability of speech $p_{DNN}(l,k)$. More specifically, the VAD 220 produces a VAD parameter (VAD(l)) indicating whether speech is present or absent.

An example suitable VAD parameter VAD(l) can be expressed as a function of the current audio frame $X_0(l,k)$ and the probability of speech $p_{DNN}(l,k)$ inferred by the DNN 122:

$$VAD_{DNN}(l) = \frac{\sum_{k=k_{min}}^{k_{max}} |X_0(l,k)| p_{DNN}(l,k)}{\sum_{k=k_{min}}^{k_{max}} |X_0(l,k)|}$$

$$VAD(l) = \begin{cases} 1 & \text{if } VAD_{DNN}(l) > Tr \\ 0 & \text{otherwise} \end{cases}$$

where $k_{min}$ and $k_{max}$ define a range of frequencies in which speech is dominant (such as 0-2 kHz) and Tr is a tuning parameter (or threshold) that converts $VAD_{DNN}(l)$ to a binary value. In some implementations, different types of VADs may be combined (in a cascaded fashion) to produce a more accurate result.

The IFC scaler 230 is configured to produce an IFC scaling factor ($\alpha_{DNN}(l,k)$) based, at least in part, on the probability of speech $p_{DNN}(l,k)$ and the VAD parameter VAD(l) associated with the current audio frame $X_0(l,k)$. As described above, the probability of speech $p_{DNN}(l,k)$ can be used to predict or estimate an IFC vector $a(l,k)$ associated with the series of input audio frames $X(l,k)$. As shown in Equation 1, the IFC vector $a(l,k)$ depends directly on the covariance of speech $\Phi_{SS}(l,k)$. Aspects of the present disclosure recognize that the speech component of an audio signal is generally nonstationary. As such, the IFC vector $a(l,k)$ can change significantly in a short period of time and therefore needs to be tracked quickly.

In some implementations, the IFC scaling factor $\alpha_{DNN}(l,k)$ may ensure that the IFC vector $a(l,k)$ is updated quickly based on rapid changes to the covariance of speech in the audio signal. For example, the IFC scaling factor $\alpha_{DNN}(l,k)$ associated with speech can be expressed as a function of a minimum update rate ($\mu_{min}^{speech}$) and a maximum update rate ($\mu_{max}^{speech}$) associated with the covariance of speech, where $\mu_{min}^{speech}$ and $\mu_{max}^{speech}$ are predetermined tuning parameters:

$$\alpha_{DNN}(l,k) = \min(1 - \mu_{min}^{search}, 1 - \mu_{max}^{speech} p_{DNN}(l,k)) \text{ if } VAD(l) = 1 \quad (2)$$

In some aspects, the probability of speech $p_{DNN}(l,k)$ also may be used to predict or estimate a covariance of noise $\Phi_{NN}(l,k)$ in the audio signal. For example, some linear filtering operations may rely on the covariance of noise $\Phi_{NN}(l,k)$, in addition to the IFC vector $a(l,k)$, to determine the weights or coefficients associated with a beamforming filter. Aspects of the present disclosure recognize that the noise component of an audio signal is much more stationary than the speech component. As such, the noise covariance matrix $\Phi_{NN}(l,k)$ can be tracked more slowly (or smoothed over time) to capture the temporal correlation associated with the series of input audio frames $X(l,k)$.

In some implementations, the IFC scaling factor $\alpha_{DNN}(l,k)$ may ensure that the covariance matrix ($\Phi_{NN}(l,k)$) is updated slowly in response to changes in the covariance of noise in the audio signal. For example, the IFC scaling factor $\alpha_{DNN}(l,k)$ associated with noise can be expressed as a function of a minimum update rate ($\mu_{min}^{noise}$) and a maximum update rate ($\mu_{max}^{noise}$) associated with the covariance of noise, where $\mu_{min}^{noise}$ and $\mu_{max}^{noise}$ are predetermined tuning parameters:

$$\alpha_{DNN}(l,k) = \min(1 - \mu_{min}^{noise}, 1 - \mu_{max}^{noise}(1 - p_{DNN}(l,k))) \text{ if } VAD(l) = 0 \quad (3)$$

$$\mu_{min}^{speech} \geq \mu_{min}^{noise}, \mu_{max}^{speech} \gg \mu_{max}^{noise}$$

The filter controller 240 is configured to produce a set of filter parameters 202 associated with the linear filter 250 based on the IFC scaling factor $\alpha_{DNN}(l,k)$, the VAD parameter VAD(l), and the series of input audio frames $X(l,k)$. For example, the filter parameters 202 may include a set of weights or coefficients to be implemented by a beamforming filter. The actual filter parameters 202 may depend on the type of beamforming implemented by the linear filter 250. In some implementations, the filter controller 240 may calculate an IFC vector $a(l,k)$ based, at least in part, on the IFC scaling factor $\alpha_{DNN}(l,k)$ and the VAD parameter VAD(l), and may use the IFC vector $a(l,k)$ to calculate the filter parameters 202.

The linear filter 250 applies the filter parameters 202 to a multi-frame beamformer and uses the beamformer to produce the enhanced audio frame $Y(l,k)$ based on the series of input audio frames $X(l,k)$. In some implementations, the linear filter 250 may include a multi-frame minimum variance distortionless response (MF-MVDR) beamformer (such as described with reference to FIG. 3). In some other implementations, the linear filter 250 may include a multi-frame generalized sidelobe cancellation (MF-GSC) beamformer (such as described with reference to FIG. 5).

Figure 3:
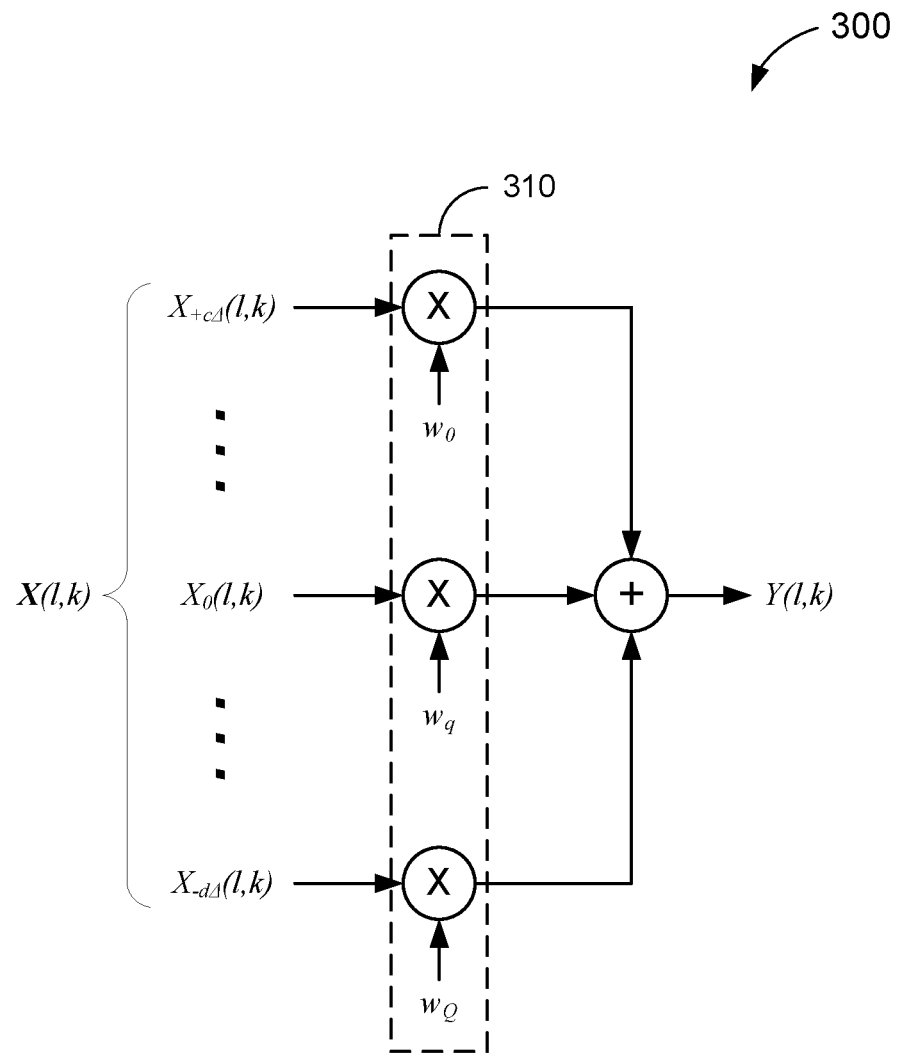
FIG. 3 shows an example multi-frame beamformer for single-channel audio signals, according to some implementations.

FIG. 3 shows an example multi-frame beamformer 300 for single-channel audio signals, according to some implementations. In some aspects, the multi-frame beamformer 300 may be one example of the linear filter 250 of FIG. 2. More specifically, the beamformer 300 may combine a series of frames $X(l,k)$ of a single-channel audio signal in a manner that produces an enhanced audio frame $Y(l,k)$. As described with reference to FIG. 2, the series of audio frames $X(l,k)$ may include the current audio frame $X_0(l,k)$, a number (c) of future audio frames $[X_{+\Delta}(l,k), \ldots, X_{+c\Delta}(l,k)]$, and a number (d) of past audio frames $[X_{-\Delta}(l,k), \ldots, X_{-d\Delta}(l,k)]$, where c+d=Q. In some implementations, the multi-frame beamformer 300 may be an MF-MVDR beamformer.

The MF-MVDR beamformer 300 includes a filter 310 that applies a vector of weights $w=[w_0, \ldots, w_Q]^T$ to the series of audio frames $X(l,k)$ to produce the enhanced audio frame $Y(l,k)$:

$$Y(l,k) = w^H(l,k)X(l,k)$$

In some aspects, a controller (such as the filter controller 240 of FIG. 2) may determine a vector of weights $w(l,k)$ that optimizes the enhanced audio frame $Y(l,k)$ with respect to one or more conditions. For example, the controller may determine a vector of weights $w(l,k)$ that reduces or minimizes the variance of the noise component of the enhanced audio frame $Y(l,k)$ without distorting the speech component of the enhanced audio frame $Y(l,k)$. In other words, the vector of weights $w(l,k)$ may satisfy the following condition:

$$\operatorname{argmin}_w w(l,k) \Phi_{NN}(l,k) w(l,k) \text{ s.t. } w^H(l,k) a_{MVDR}(l,k) = 1$$

where $a_{MVDR}(l,k)$ is the IFC vector associated with the speech component of the audio frames $X(l,k)$. The resulting vector of weights $w(l,k)$ represents an MF-MVDR beamforming filter ($w_{MVDR}(l,k)$), which can be expressed as:

$$w_{MVDR}(l, k) = \frac{\phi_{NN}^{-1}(l, k)a_{MVDR}(l, k)}{a_{MVDR}^H(l, k)\phi_{NN}^{-1}(l, k)a_{MVDR}(l, k)} \quad (4)$$

Figure 4:
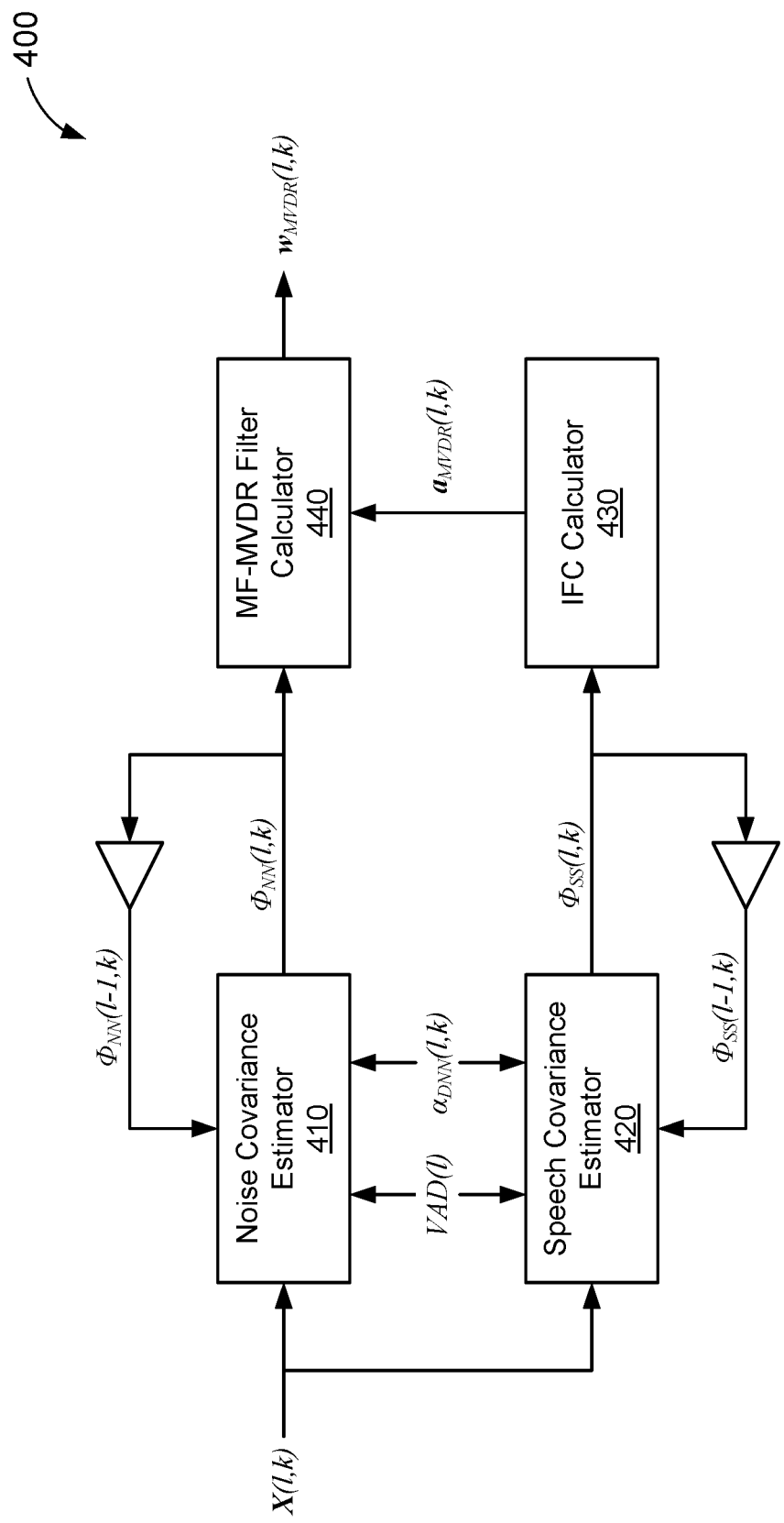
FIG. 4 shows a block diagram of an example controller for a multi-frame beamformer, according to some implementations.

FIG. 4 shows a block diagram of an example controller 400 for a multi-frame beamformer, according to some implementations. In some aspects, the controller 400 may be one example of the filter controller 240 of FIG. 2 and the multi-frame beamformer may be one example of the MF-MVDR beamformer 300 of FIG. 3. More specifically, the controller 400 may produce an MF-MVDR beamforming filter $w_{MVDR}(l,k)$ based on an IFC scaling factor $\alpha_{DNN}(l,k)$, a VAD parameter VAD(l), and a series of audio frames $X(l,k)$. With reference for example to FIG. 2, the IFC scaling factor $\alpha_{DNN}(l,k)$ may be produced by the IFC scaler 230, the VAD parameter VAD(l) may be produced by the VAD 220, and the series of audio frames $X(l,k)$ may include the current audio frame $X_0(l,k)$, a number (c) of future audio frames $X^{future}(l,k)$, and a number (d) of past audio frames $X^{past}(l,k)$.

The controller 400 includes a noise covariance estimator 410, a speech covariance estimator 420, an IFC calculator 430, and an MF-MVDR filter calculator 440. The noise covariance estimator 410 is configured to determine the covariance of noise ($\Phi_{NN}(l,k)$) associated with the current audio frame $X_0(l,k)$ based on the IFC scaling factor $\alpha_{DNN}(l,k)$, the VAD parameter VAD(l), and the series of audio frames $X(l,k)$. In some implementations, the noise covariance estimator 410 may update the noise covariance matrix $\Phi_{NN}(l,k)$ when VAD(l) indicates that speech is absent from the current audio frame $X_0(l,k)$ and may refrain from updating the noise covariance matrix $\Phi_{NN}(l,k)$ when VAD(l) indicates that speech is present in the current audio frame $X_0(l,k)$. Thus, the noise covariance matrix associated with the current audio frame ($\Phi_{NN}(l,k)$) may be expressed as a function of the noise covariance matrix associated with a previous audio frame ($\Phi_{NN}(l-1, k)$):

$$\Phi_{NN}(l, k) = \begin{cases} \alpha_{DNN}(l, k)\Phi_{NN}(l-1, k) + (1 - \alpha_{DNN}(l, k)) \\ (X(l, k)X^H(l, k)) & \text{if } VAD(l) = 0 \\ \Phi_{NN}(l-1, k) & \text{if } VAD(l) = 1 \end{cases}$$

The speech covariance estimator 420 is configured to determine the covariance of speech $\Phi_{SS}(l,k)$ associated with the current audio frame $X_0(l,k)$ based on the IFC scaling factor $\alpha_{DNN}(l,k)$, the VAD parameter VAD(l), and the series of audio frames $X(l,k)$. In some implementations, the speech covariance estimator 420 may update the speech covariance matrix $\Phi_{SS}(l,k)$ when VAD(l) indicates that speech is present in the current audio frame $X_0(l,k)$ and may refrain from updating the speech covariance matrix ($\Phi_{SS}(l,k)$ when VAD (l) indicates that speech is absent from the current audio frame $X_0(l,k)$. Thus, the speech covariance matrix associated with the current audio frame $\Phi SS(l,k)$ may be expressed as a function of the speech covariance matrix associated with a previous audio frame $\Phi_{SS}(l-1, k)$:

$$\Phi_{SS}(l, k) = \begin{cases} \alpha_{DNN}(l, k)\Phi_{SS}(l-1, k) + (1 - \alpha_{DNN}(l, k)) \\ (X(l, k)X^H(l, k)) & \text{if } VAD(l) = 1 \\ \Phi_{SS}(l-1, k) & \text{if } VAD(l) = 0 \end{cases}$$

The IFC calculator 430 determines an IFC vector ($a_{MVDR}(l,k)$) based on the speech covariance matrix ($\Phi_{SS}(l,k)$). For example, the IFC vector $a_{MVDR}(l,k)$ may be calculated according to Equation 1. The MF-MVDR filter calculator 440 determines the MF-MVDR filter based on the noise covariance matrix ($\Phi_{NN}(l,k)$) and the IFC vector $a_{MVDR}(l,k)$. For example, the MF-MVDR filter $w_{MVDR}(l,k)$ may be calculated according to Equation 4. With reference for example to FIG. 2, the MF-MVDR filter $w_{MVDR}(l,k)$ may be provided to the linear filter 250 (as the set of filter parameters 202). The linear filter 250 applies the MF-MVDR filter $w_{MVDR}(l,k)$ to the series of audio frames $X(l,k)$ to produce the enhanced audio frame $Y(l,k)$ (such as described with reference to FIG. 3).

Figure 5:
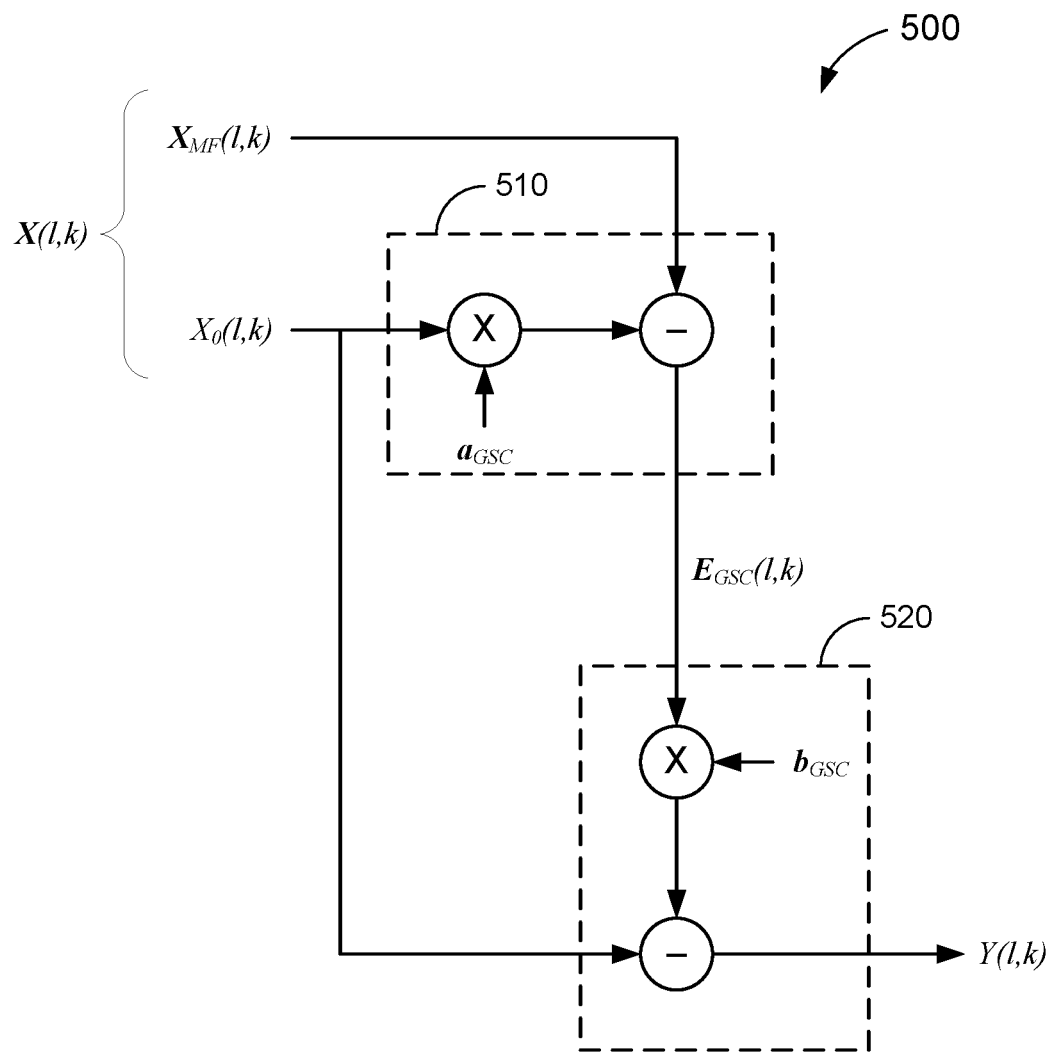
FIG. 5 shows another example multi-frame beamformer for single-channel audio signals, according to some implementations.

FIG. 5 shows another example multi-frame beamformer 500 for single-channel audio signals, according to some implementations. In some aspects, the multi-frame beamformer 500 may be one example of the linear filter 250 of FIG. 2. More specifically, the beamformer 500 may combine a series of frames $X(l,k)$ of a single-channel audio signal in a manner that produces an enhanced audio frame $Y(l,k)$. As described with reference to FIG. 2, the series of audio frames $X(l,k)$ may include the current audio frame $X_0(l,k)$, a number (c) of future audio frames $X^{future}(l,k)$, and a number (d) of past audio frames $X^{past}(l,k)$, where $X_{MF}(l,k)=[X^{future}(l,k),X^{past}(l,k)]$ and c+d=Q. In some implementations, the multi-frame beamformer 300 may be an MF-GSC beamformer.

The MF-GSC beamformer 500 includes an IFC component 510 and a noise cancellation (NC) component 520. The IFC component 510 produces a noise signal $E_{GSC}(l,k)$ based on the series of audio frames $X(l,k)$ and an IFC vector ($a_{GSC}(l,k)$). More specifically, the noise signal $E_{GSC}(l,k)$ may represent the noise component of the current audio frame $X_0(l,k)$. In some implementations, the IFC vector $a_{GSC}(l,k)$ may convert the current audio frame $X_0(l,k)$ into a vector of dimension 1×Q (to match the dimensions of $X_{MF}(l,k)$), so that a speech component of the audio signal can be subtracted from the past and future audio frames $X_{MF}(l,k)$ to obtain the noise signal $E_{GSC}(l,k)$:

$$E_{GSC}(l, k) = X_{MF}(l, k) - a_{GSC}(l, k)X_0(l, k) \quad (5)$$

The NC component 520 produces the enhanced audio frame $Y(l,k)$ based on the noise signal $E_{GSC}(l,k)$, the current audio frame $X_0(l,k)$, and an MF-GSC beamforming filter ($b_{GSC}(l,k)$). In some implementations, the MF-GSC beamforming filter $b_{GSC}(l,k)$ may convert the noise signal $E_{GSC}(l,k)$ into a one-dimensional signal (to match the dimensions of $X_0(l,k)$), so that a noise component of the audio signal can be subtracted from the current audio frame $X_0(l,k)$ to obtain the enhanced audio frame $Y(l,k)$:

$$Y(l, k) = X_0(l, k) - b_{GSC}^H(l, k)E_{GSC}^T(l, k) \quad (6)$$

Figure 6:
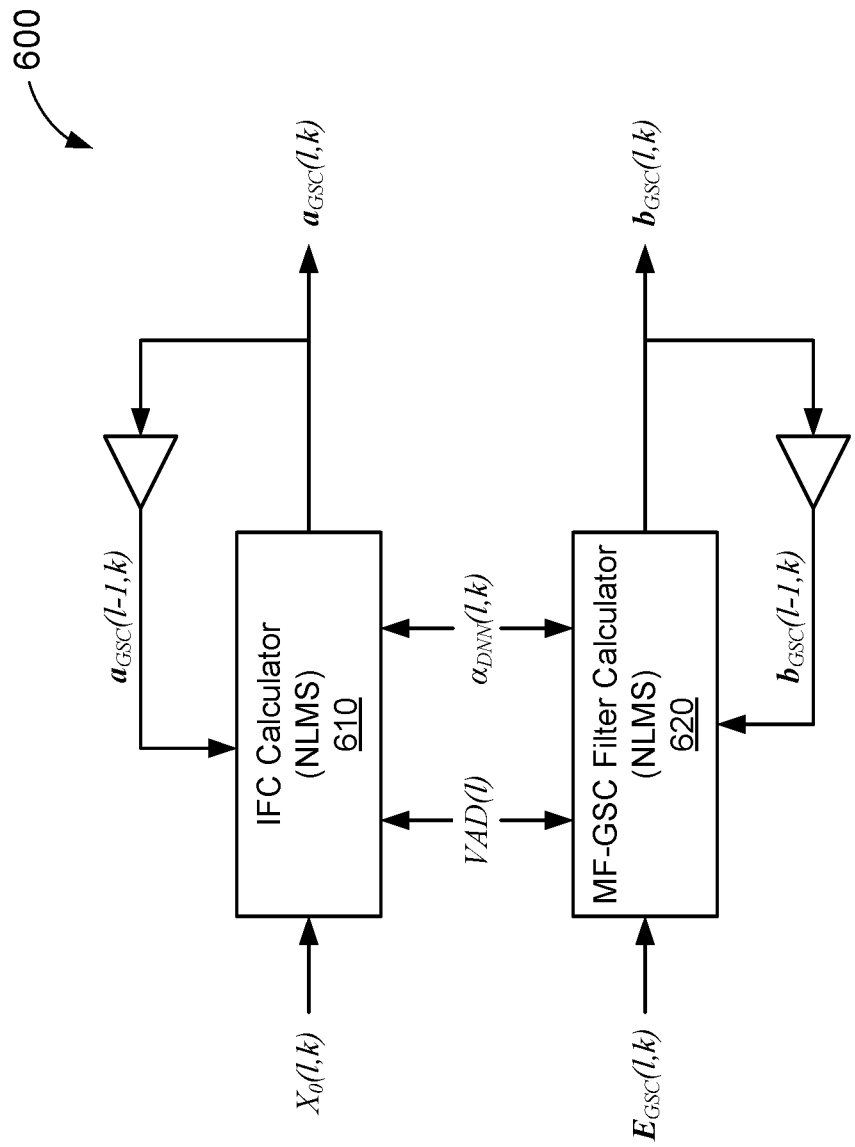
FIG. 6 shows another block diagram of an example controller for a multi-frame controller, according to some implementations.

FIG. 6 shows another block diagram of an example controller 600 for a multi-frame beamformer, according to some implementations. In some aspects, the controller 600 may be one example of the filter controller 240 of FIG. 2 and the multi-frame beamformer may be one example of the MF-GSC beamformer 500 of FIG. 5. More specifically, the controller 600 may produce an IFC vector $a_{GSC}(l,k)$ and an MF-GSC beamforming filter $b_{GSC}(l,k)$ based on an IFC scaling factor $\alpha_{DNN}(l,k)$, a VAD parameter VAD(l), and a series of audio frames X(l,k). With reference for example to FIG. 2, the IFC scaling factor $\alpha_{DNN}(l,k)$ may be produced by the IFC scaler 230, the VAD parameter VAD(l) may be produced by the VAD 220, and the series of audio frames X(l,k) may include the current audio frame $X_0(l,k)$, a number (c) of future audio frames $X^{future}(l,k)$, and a number (d) of past audio frames $X^{past}(l,k)$.

The controller 600 includes an IFC calculator 610 and an MF-GSC filter calculator 620. The IFC calculator 610 is configured to estimate the IFC vector $a_{GSC}(l,k)$ based on the IFC scaling factor $\alpha_{DNN}(l,k)$, the VAD parameter VAD(l), and the current audio frame $X_0(l,k)$. In some implementations, the IFC calculator 610 may estimate the IFC vector $a_{GSC}(l,k)$ by minimizing a loss function $(LOSS_{IFC}(l,k))$ according to a normalized least mean squares (NLMS) algorithm, where $LOSS_{IFC}(l,k)=|E_{GSC}(l,k)|^2$ and $E_{GSC}(l,k)$ is the noise signal in Equation 5. For example, the IFC vector $a_{GSC}(l,k)$ can be expressed as an NLMS filter that is updated if VAD(l) indicates that speech is present in the current audio frame, but is not updated if VAD(l) indicates that speech is absent from the current audio frame:

$$a_{GSC}(l,k) = \begin{cases} a_{GSC}(l-1,k) + \mu_{IFC}(l,k)(1-\alpha_{DNN}(l,k)) \frac{\nabla Loss_{IFC}(l,k)}{|X_0(l,k)|^2} & \text{if } VAD(l)=1 \\ a_{GSC}(l-1,k) & \text{if } VAD(l)=0 \end{cases}$$

$$\nabla Loss_{IFC}(l,k) = E_{GSC}^H(l,k) X_0(l,k)$$

where $\mu_{IFC}(l,k)$ is a step size or learning rate associated with the NLMS algorithm and $\nabla Loss_{IFC}(l,k)$ is the derivative of $LOSS_{IFC}(l,k)$.

In some implementations, the step size $\mu_{IFC}(l,k)$ may be a predetermined or fixed tuning parameter. In some other implementations, the step size $\mu_{IFC}(l,k)$ may vary across the time-frequency domain, as a function $(f)$ of $\nabla Loss_{IFC}(l,k)$:

$$\mu_{IFC}(l,k) = \mu_0 f(\nabla Loss_{IFC}(l,k))$$

where $\mu_0$ is a fixed hyperparameter associated with the IFC vector $a_{GSC}(l,k)$.

The MF-GSC filter calculator 620 is configured to estimate the MF-GSC beamforming filter $b_{GSC}(l,k)$ based on the IFC scaling factor $\alpha_{DNN}(l,k)$, the VAD parameter VAD(l), and the noise signal $E_{GSC}(l,k)$. In some implementations, the MF-GSC filter calculator 620 may estimate the MF-GSC beamforming filter $b_{GSC}(l,k)$ by minimizing a loss function $(LOSS_{NC}(l,k))$ according to an NLMS algorithm, where $LOSS_{NC}(l,k)=|Y(l,k)|^2$. For example, the MF-GSC beamforming filter $b_{GSC}(l,k)$ can be expressed as an NLMS filter that is updated if VAD(l) indicates that speech is absent from the current audio frame, but is not updated if VAD(l) indicates that speech is present in the current audio frame:

$$b_{GSC}(l,k) = \begin{cases} b_{GSC}(l-1,k) + \mu_{NC}(l,k)(1-\alpha_{DNN}(l,k)) \frac{\nabla Loss_{NC}(l,k)}{E_{GSC}^H(l,k)E_{GSC}(l,k)} & \text{if } VAD(l)=0 \\ b_{GSC}(l-1,k) & \text{if } VAD(l)=1 \end{cases}$$

$$\nabla Loss_{NC}(l,k) = Y^*(l,k) E_{GSC}^T(l,k)$$

where $\mu_{NC}(l,k)$ is a step size or learning rate associated with the NLMS algorithm and $\nabla Loss_{NC}(l,k)$ is the derivative of $Loss_{NC}(l,k)$.

In some implementations, the step size $\mu_{NC}(l,k)$ may be a predetermined or fixed tuning parameter. In some other implementations, the step size $\mu_{NC}(l,k)$ may vary across the time-frequency domain, as a function $(f)$ of $\nabla Loss_{NC}(l,k)$:

$$\mu_{NC}(l,k) = \mu_1 f(\nabla Loss_{NC}(l,k))$$

where $\mu_1$ is a fixed hyperparameter associated with the MF-GSC beamforming filter $b_{GSC}(l,k)$.

Figure 7:
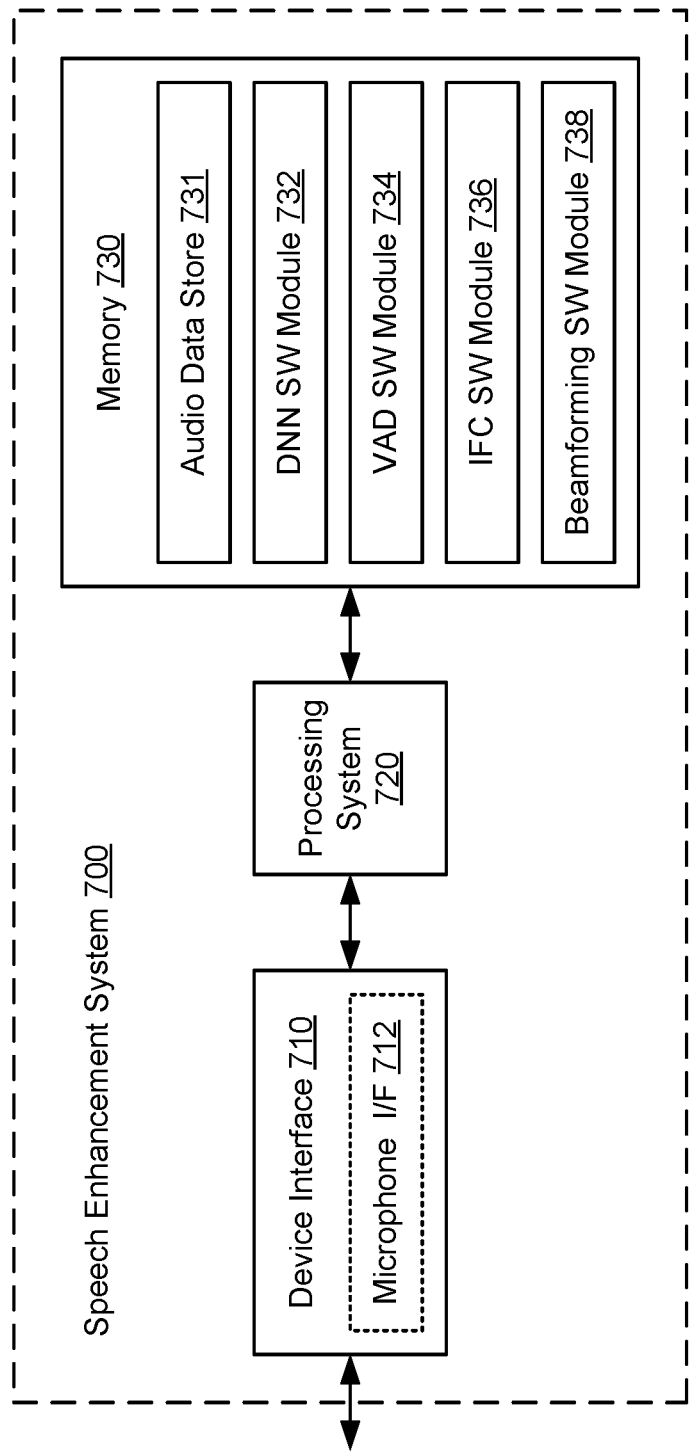
FIG. 7 shows another block diagram of an example speech enhancement system, according to some implementations.

FIG. 7 shows another block diagram of an example speech enhancement system 700, according to some implementations. More specifically, the speech enhancement system 700 may be configured to receive a single-channel audio signal and produce an enhanced audio signal by filtering or suppressing noise in the received audio signal. In some implementations, the speech enhancement system 700 may be one example of the speech enhancement component 120 of FIG. 1. The speech enhancement system 700 includes a device interface 710, a processing system 720, and a memory 730.

The device interface 710 is configured to communicate with one or more components of an audio receiver (such as the microphone 110 of FIG. 1). In some implementations, the device interface 710 may include a microphone interface (I/F) 712 configured to receive a single-channel audio signal via a microphone. In some implementations, the microphone interface 712 may sample or receive individual frames of the audio signal at a frame hop associated with the speech enhancement system 700. For example, the frame hop may represent a frequency at which an application requires or otherwise expects to receive enhanced audio frames from the speech enhancement system 700.

The memory 730 may include an audio data store 731 configured to store a series of frames of the single-channel audio signal as well as any intermediate signals that may be produced by the speech enhancement system 700 as a result of performing the speech enhancement operation. The memory 730 also may include a non-transitory computer-readable medium (including one or more nonvolatile memory elements, such as EPROM, EEPROM, Flash memory, or a hard drive, among other examples) that may store at least the following software (SW) modules:

- a DNN SW module 732 to infer a probability of speech ($p_{DNN}$) in a first frame of the series of frames based on a neural network;
- a VAD SW module 734 to determine a VAD parameter based at least in part on the probability of speech $p_{DNN}$, where the VAD parameter indicates whether speech is present or absent in the first frame;
- an IFC SW module 736 to determine an IFC vector associated with a speech component of the audio signal based at least in part on the probability of speech $p_{DNN}$ and the VAD parameter, where the IFC vector indicates an interframe correlation of the speech component between consecutive frames in the series of frames; and
- a beamforming SW module 738 to filter a noise component of the audio signal from the first frame based at least in part on the IFC vector and the series of frames.

Each software module includes instructions that, when executed by the processing system 720, causes the speech enhancement system 700 to perform the corresponding functions.

The processing system 720 may include any suitable one or more processors capable of executing scripts or instructions of one or more software programs stored in the speech enhancement system 700 (such as in the memory 730). For example, the processing system 720 may execute the DNN SW module 732 to infer a probability of speech ($p_{DNN}$) in a first frame of the series of frames based on a neural network. The processing system 720 also may execute the VAD SW module 734 to determine a VAD parameter based at least in part on the probability of speech $p_{DNN}$, where the VAD parameter indicates whether speech is present or absent in the first frame.

Further, the processing system 720 may execute the IFC SW module 736 to determine an IFC vector associated with a speech component of the audio signal based at least in part on the probability of speech $p_{DNN}$ and the VAD parameter, where the IFC vector indicates an interframe correlation of the speech component between consecutive frames in the series of frames. Still further, the processing system 720 may execute the beamforming SW module 738 to filter a noise component of the audio signal from the first frame based at least in part on the IFC vector and the series of frames.

Figure 8:
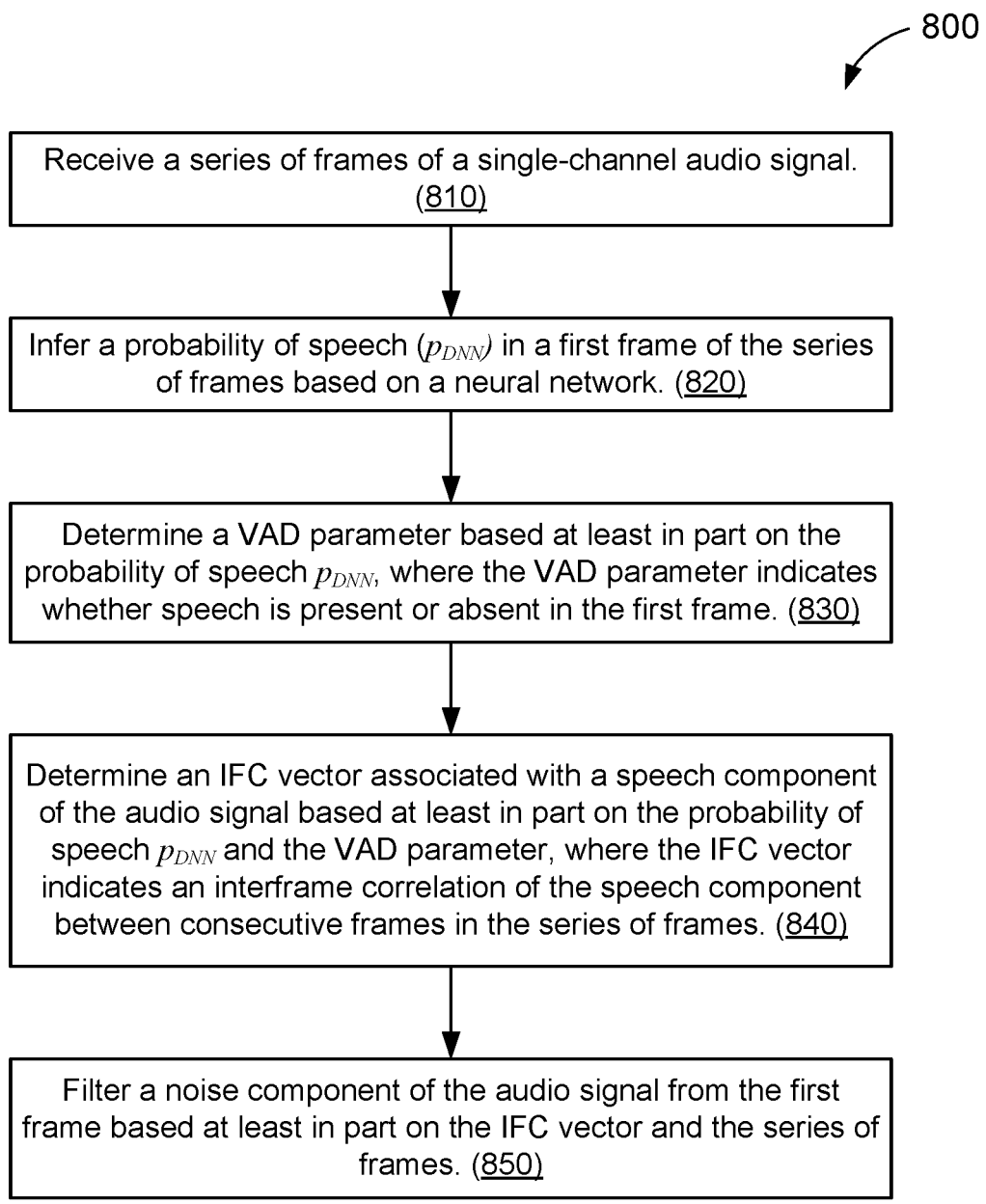
FIG. 8 shows an illustrative flowchart depicting an example operation for processing audio signals, according to some implementations.

FIG. 8 shows an illustrative flowchart depicting an example operation 800 for processing audio signals, according to some implementations. In some implementations, the example operation 800 may be performed by a speech enhancement system such as the speech enhancement component 120 of FIG. 1 or the speech enhancement system 200 of FIG. 2.

The speech enhancement system receives a series of frames of a single-channel audio signal (810). The speech enhancement system infers a probability of speech ($p_{DNN}$) in a first frame of the series of frames based on a neural network (820). The speech enhancement system further determines a VAD parameter based at least in part on the probability of speech $p_{DNN}$, where the VAD parameter indicates whether speech is present or absent in the first frame (830). The speech enhancement system determines an IFC vector associated with a speech component of the audio signal based at least in part on the probability of speech $p_{DNN}$ and the VAD parameter, where the IFC vector indicates an interframe correlation of the speech component between consecutive frames in the series of frames (840). Further, the speech enhancement system filters a noise component of the audio signal from the first frame based at least in part on the IFC vector and the series of frames (850).

In some aspects, the speech enhancement system may further determine a scaling factor ($\alpha_{DNN}$) based at least in part on the VAD parameter and the probability of speech $p_{DNN}$, where the IFC vector is further determined based on the scaling factor $\alpha_{DNN}$. In some implementations, the scaling factor $\alpha_{DNN}$ may be further determined based on a minimum update rate ($\mu_{min}^{speech}$) and a maximum update rate ($\mu_{max}^{speech}$) associated with a covariance of the speech component of the audio signal and a minimum update rate ($\mu_{min}^{noise}$) and a maximum update rate ($\mu_{max}^{noise}$) associated with a covariance of the noise component of the audio signal, where $\mu_{max}^{speech} > \mu_{max}^{noise}$ and $\mu_{min}^{speech} \geq \mu_{min}^{noise}$. In some implementations, the scaling factor $\alpha_{DNN}$ may be equal to the lesser of $1-\mu_{min}^{speech}$ or $1-\mu_{max}^{speech} p_{DNN}$ when the VAD parameter indicates that speech is present in the first frame, and may be equal to the lesser of $1-\mu_{min}^{noise}$ or $1-\mu_{max}^{noise}(1-p_{DNN})$ when the VAD parameter indicates that speech is absent in the first frame.

In some aspects, the noise component of the audio signal may be filtered from the first frame based on an MF-MVDR beamformer that reduces a power of the noise component of the audio signal without distorting the speech component. In some implementations, the speech enhancement system may further determine a covariance of the speech component ($\Phi_{SS}$) and a covariance of the noise component ($\Phi_{NN}$) of the audio signal based at least in part on the VAD parameter and the probability of speech $p_{DNN}$; and determine a filter ($w_{MVDR}$) associated with the MF-MVDR beamformer based on the covariance of the speech component $\Phi_{SS}$ and the covariance of the noise component ($\Phi_{NN}$ of the audio signal. In some implementations, the filtering of the noise component from the first frame may include weighting each frame in the series of frames by a respective coefficient of the filter $w_{MVDR}$; and summing the sequence of weighted frames.

In some other aspects, the speech enhancement system may further determine a noise signal based on the IFC vector and the series of frames, where the noise signal represents the noise component of the audio signal in the first frame; and determine an NLMS filter ($b_{GSC}$) associated with the noise signal based at least in part on the VAD parameter. In some implementations, the IFC vector may be an NLMS filter ($a_{GSC}$) associated with the first frame. In some implementations, the filtering of the noise component from the first frame may include transforming the noise signal based on the NLMS filter $b_{GSC}$; and subtracting the transformed noise signal from the first frame.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of speech enhancement, comprising:
receiving a series of frames of a single-channel audio signal;
inferring a probability of speech ($p_{DNN}$) in a first frame of the series of frames based on a neural network;
determining a voice activity detection (VAD) parameter based at least in part on the probability of speech $p_{DNN}$, the VAD parameter indicating whether speech is present or absent in the first frame;
determining an interframe correlation (IFC) vector associated with a speech component of the audio signal based at least in part on the probability of speech $p_{DNN}$ and the VAD parameter, the IFC vector indicating an interframe correlation of the speech component between consecutive frames in the series of frames; and
filtering a noise component of the audio signal from the first frame based at least in part on the IFC vector and the series of frames.

2. The method of claim 1, further comprising:
determining a scaling factor ($\alpha_{DNN}$) based at least in part on the VAD parameter and the probability of speech $p_{DNN}$, the IFC vector being further determined based on the scaling factor $\alpha_{DNN}$.

3. The method of claim 2, wherein the scaling factor $\alpha_{DNN}$ is further determined based on a minimum update rate ($\mu_{min}^{speech}$) and a maximum update rate ($\mu_{max}^{speech}$) associated with a covariance of the speech component of the audio signal and a minimum update noise rate ($\mu_{min}^{noise}$) and a maximum update rate ($\mu_{max}^{noise}$) associated with a covariance of the noise component of the audio signal, where $\mu_{max}^{speech} > \mu_{max}^{noise}$ and $\mu_{min}^{speech} \geq \mu_{min}^{noise}$.

4. The method of claim 3, wherein the scaling factor $\alpha_{DNN}$ is equal to the lesser of $1-\mu_{min}^{speech}$ or $1-\mu_{max}^{speech}$ speech $p_{DNN}$ when the VAD parameter indicates that speech is present in the first frame, and is equal to the lesser of $1-\mu_{min}^{noise}$ or $1-\mu_{max}^{noise}(1-p_{DNN})$ when the VAD parameter indicates that speech is absent in the first frame.

5. The method of claim 1, wherein the noise component of the audio signal is filtered from the first frame based on a multi-frame minimum variance distortionless response (MF-MVDR) beamformer that reduces a power of the noise component of the audio signal without distorting the speech component.

6. The method of claim 5, further comprising:
determining a covariance of the speech component ($\Phi_{SS}$) and a covariance of the noise component ($\Phi_{NN}$) of the audio signal based at least in part on the VAD parameter and the probability of speech $p_{DNN}$; and
determining a filter ($w_{MVDR}$) associated with the MF-MVDR beamformer based on the covariance of the speech component $\Phi_{SS}$ and the covariance of the noise component $\Phi_{NN}$ of the audio signal.

7. The method of claim 6, wherein the filtering of the noise component from the first frame comprises:
weighting each frame in the series of frames by a respective coefficient of the filter $w_{MVDR}$; and
summing the sequence of weighted frames.

8. The method of claim 1, further comprising:
determining a noise signal based on the IFC vector and the series of frames, the noise signal representing the noise component of the audio signal in the first frame; and
determining a normalized least mean squares (NLMS) filter ($b_{GSC}$) associated with the noise signal based at least in part on the VAD parameter.

9. The method of claim 8, wherein the IFC vector comprises an NLMS filter ($a_{GSC}$) associated with the first frame.

10. The method of claim 8, wherein the filtering of the noise component from the first frame comprises:
transforming the noise signal based on the NLMS filter $b_{GSC}$; and
subtracting the transformed noise signal from the first frame.

11. A speech enhancement system comprising:
a processing system; and
a memory storing instructions that, when executed by the processing system, causes the speech enhancement system to:
receive a series of frames of a single-channel audio signal;
infer a probability of speech ($p_{DNN}$) in a first frame of the series of frames based on a neural network;
determine a voice activity detection (VAD) parameter based at least in part on the probability of speech $p_{DNN}$, the VAD parameter indicating whether speech is present or absent in the first frame;
determine an interframe correlation (IFC) vector associated with a speech component of the audio signal based at least in part on the probability of speech $p_{DNN}$ and the VAD parameter, the IFC vector indicating an interframe correlation of the speech component between consecutive frames in the series of frames; and
filter a noise component of the audio signal from the first frame based at least in part on the IFC vector and the series of frames.

12. The speech enhancement system of claim 11, wherein execution of the instructions further causes the speech enhancement system to:
determine a scaling factor ($\alpha_{DNN}$) based at least in part on the VAD parameter and the probability of speech $p_{DNN}$, the IFC vector being further determined based on the scaling factor $\alpha_{DNN}$.

13. The speech enhancement system of claim 12, wherein the scaling factor $\alpha_{DNN}$ is further determined based on a minimum update rate ($\mu_{min}^{speech}$) and a maximum update rate ($\mu_{max}^{speech}$) associated with a covariance of the speech component of the audio signal and a minimum update rate ($\mu_{min}^{noise}$) and a maximum update rate ($\mu_{max}^{noise}$) associated with a covariance of the noise component of the audio signal, where $\mu_{max}^{speech} > \mu_{max}^{noise}$ and $\mu_{min}^{speech} \geq \mu_{min}^{noise}$.

14. The speech enhancement system of claim 13, wherein the scaling factor $\alpha_{DNN}$ is equal to the lesser of $1-\mu_{min}^{speech}$ or $1-\mu_{max}^{speech} p_{DNN}$ when the VAD parameter indicates that speech is present in the first frame, and is equal to the lesser of $1-\mu_{min}^{noise}$, noise or $1-\mu_{max}^{noise}((1-p_{DNN})$ when the VAD parameter indicates that speech is absent in the first frame.

15. The speech enhancement system of claim 11, wherein the noise component of the audio signal is filtered from the first frame based on a multi-frame minimum variance distortionless response (MF-MVDR) beamformer that reduces a power of the noise component of the audio signal without distorting the speech component.

16. The speech enhancement system of claim 15, wherein execution of the instructions further causes the speech enhancement system to:
determine a covariance of the speech component ($\Phi_{SS}$) and a covariance of the noise component ($\Phi_{NN}$) of the audio signal based at least in part on the VAD parameter and the probability of speech $p_{DNN}$; and determine a filter ($w_{MVDR}$) associated with the MF-MVDR beamformer based on the covariance of the speech component $\Phi_{SS}$ and the covariance of the noise component ØNN of the audio signal.

17. The speech enhancement system of claim 16, wherein the filtering of the noise component from the first frame comprises:

weighting each frame in the series of frames by a respective coefficient of the filter $w_{MVDR}$; and summing the sequence of weighted frames.

18. The speech enhancement system of claim 11, wherein execution of the instructions further causes the speech enhancement system to:

determine a noise signal representing the noise component in the first frame based on the IFC vector and the series of frames; and determine a normalized least mean squares (NLMS) filter ($b_{GSC}$) associated with the noise signal based at least in part on the VAD parameter.

19. The speech enhancement system of claim 18, wherein the IFC vector comprises an NLMS filter ($a_{GSC}$) associated with the first frame.

20. The speech enhancement system of claim 18, wherein the filtering of the noise component from the first frame comprises:

transform the noise signal based on the NLMS filter $b_{GSC}(l)$; and subtract the transformed noise signal from the first frame.

* * * * *